Figure 1:
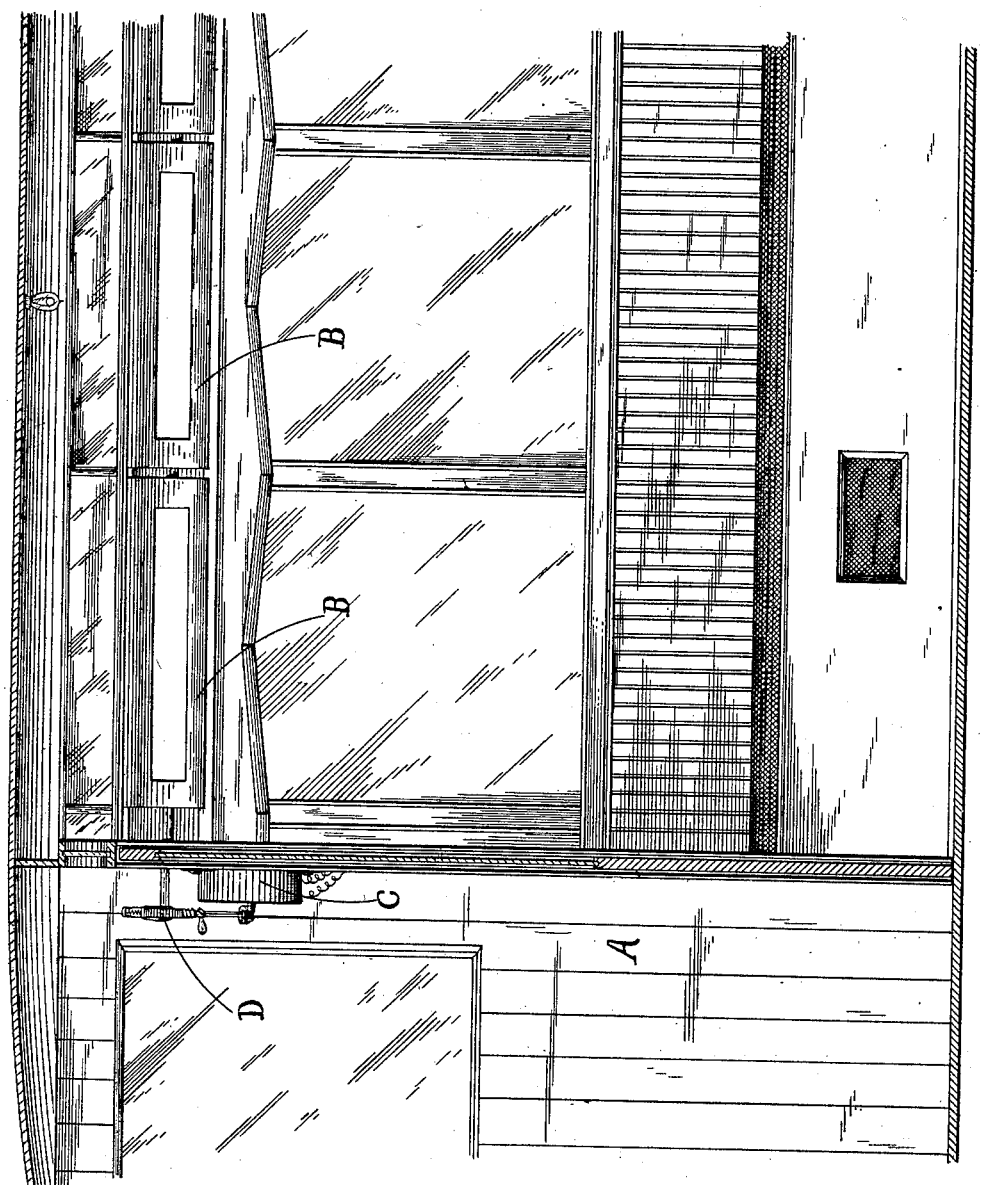

No. 697,240. Patented Apr. 8, 1902.
J. S. DRUAR & J. G. KREGER.
ADVERTISING DEVICE.
(Application filed Jan. 24, 1901.)
(No Model.) 4 Sheets—Sheet 1.

Witnesses. Inventors.

No. 697,240. Patented Apr. 8, 1902.
J. S. DRUAR & J. G. KREGER.
ADVERTISING DEVICE.
(Application filed Jan. 24, 1901.)
(No Model.) 4 Sheets—Sheet 2.
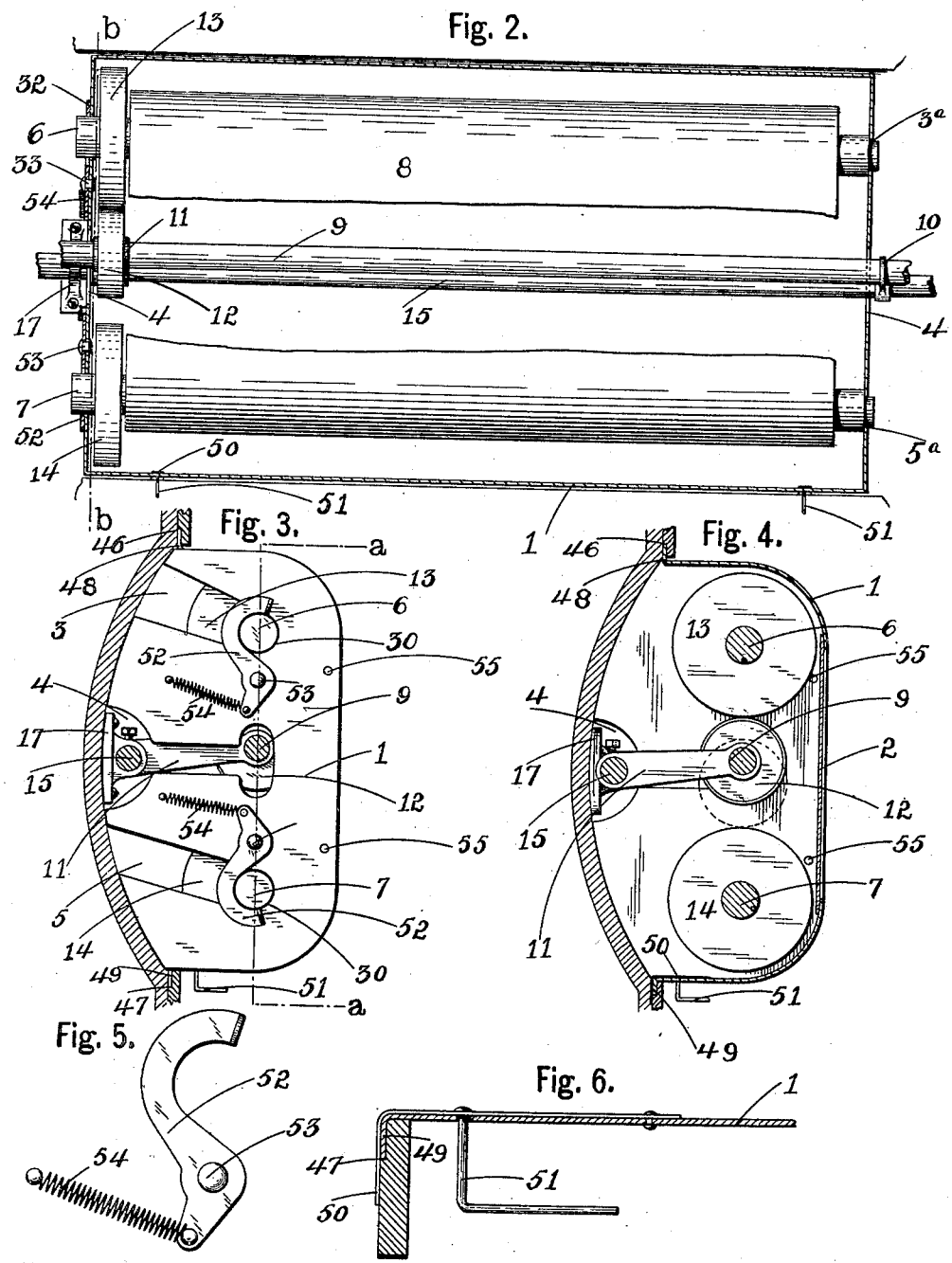
Witnesses.
L. M. Billings.
Geo. A. Neubauer.
Inventors.
John S. Druar.
John G. Kreger.
By A. J. Langston
Attorney.

No. 697,240. Patented Apr. 8, 1902.
J. S. DRUAR & J. G. KREGER.
ADVERTISING DEVICE.
(Application filed Jan. 24, 1901.)
(No Model.) 4 Sheets—Sheet 3.
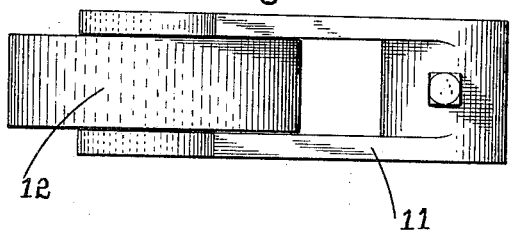
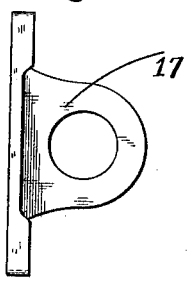
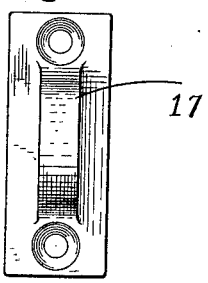
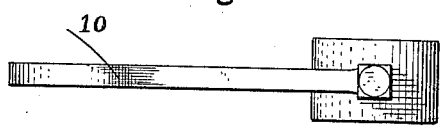
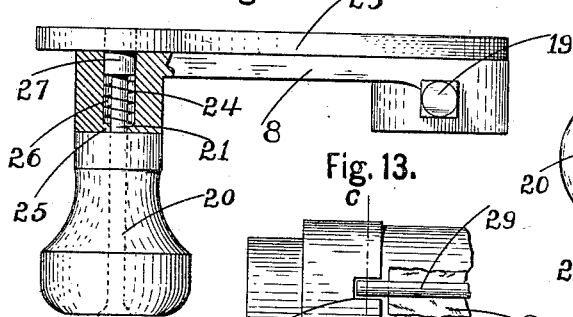
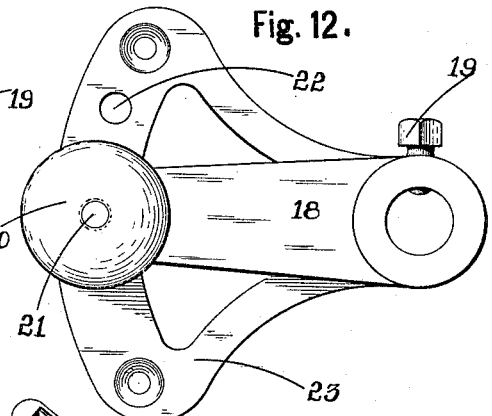
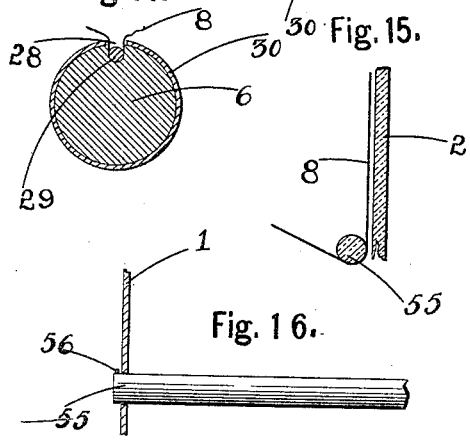
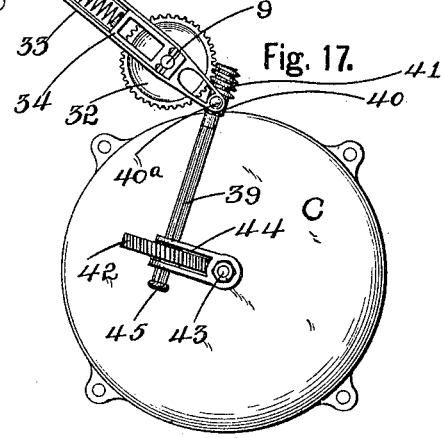
Witnesses.
L. M. Billings.
Geo. A. Neubauer.
Inventors.
John S. Druar.
John G. Kreger.
By A. J. Sangster, Attorney.
THE NORRIS PETERS CO., PHOTO-LITHO., WASHINGTON, D. C.

No. 697,240. Patented Apr. 8, 1902.
J. S. DRUAR & J. G. KREGER.
ADVERTISING DEVICE.
(Application filed Jan. 24, 1901.)
(No Model.) 4 Sheets—Sheet 4.
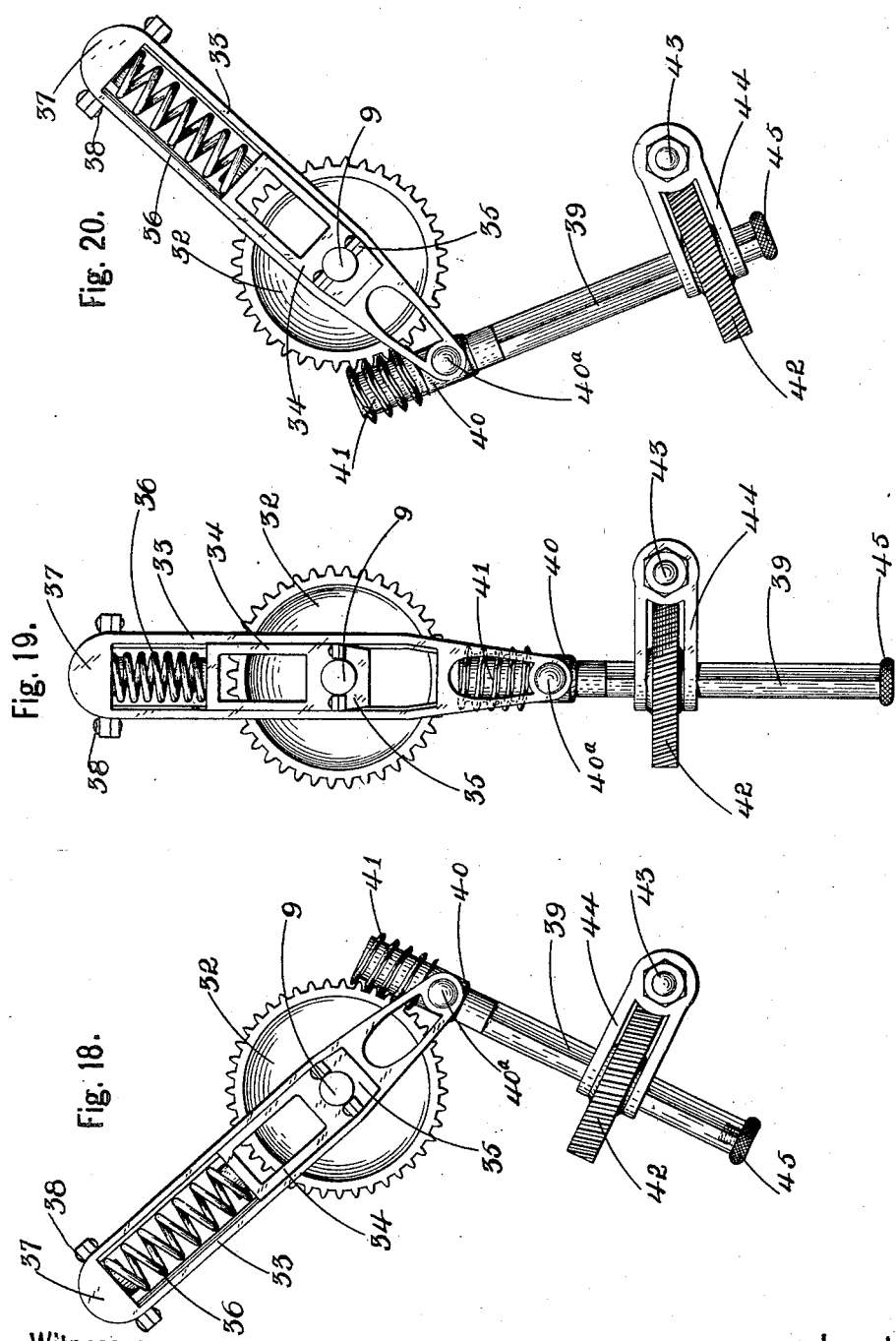
Witnesses.
L. M. Billings.
Geo. A. Neubauer.
Inventors.
John S. Druar.
John G. Kreger.
By A. J. Sangster
Attorney.

UNITED STATES PATENT OFFICE.

JOHN S. DRUAR AND JOHN G. KREGER, OF BUFFALO, NEW YORK.

ADVERTISING DEVICE.

SPECIFICATION forming part of Letters Patent No. 697,240, dated April 8, 1902.

Application filed January 24, 1901. Serial No. 44,610. (No model.)

*To all whom it may concern:*

Be it known that we, JOHN S. DRUAR and JOHN G. KREGER, citizens of the United States, residing at Buffalo, in the county of Erie and State of New York, have invented certain new and useful Improvements in Advertising Devices, of which the following is a specification.

Our invention relates to an improved advertising device which is chiefly adapted to be placed in the cars of steam or street railways; and it consists principally of an inclosing case containing a series of advertisements mounted upon rollers and mechanism for rotating said rollers to successively reveal the advertisements through a window or opening in the inclosing case.

The main object of the invention is to lessen the cost of advertisements by increasing the number of advertisements that can be placed in a certain-sized space.

Other objects of the invention are to provide for the operation of a plurality of these devices by a single motor, to reverse the mechanism when the ribbon or strip upon which the advertisements are placed has become entirely unrolled from one roller, and to maintain the ribbon or strip in proper display position in the window.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 1 represents a fragmentary section through a car equipped with our improved advertising device. Fig. 2 is an enlarged vertical longitudinal section through one of the advertising devices on line $a\,a$, Fig. 3. Fig. 3 is an enlarged end elevation of one of the advertising devices. Fig. 4 is an enlarged vertical transverse section on line $b\,b$, Fig. 2. Fig. 5 is an enlarged detached view of one of the latching devices and its spring. Fig. 6 is an enlarged fragmentary section of the inclosing case on line $b\,b$, Fig. 2, to illustrate one of the spring locking-pieces. Fig. 7 is an enlarged detached view of the forked support for the shifting operating-shaft. Fig. 8 is an enlarged detached view of the single arm-support for the shifting operating-lever. Fig. 9 is a detached enlarged side view of one of the bearing-brackets. Fig. 10 is a detached enlarged top plan view of one of the bearing-brackets. Fig. 11 is an enlarged detached edge view, partially in section, of the shifting-handle and its lock-plate. Fig. 12 is an enlarged detached side view of the shifting-handle and its lock-plate. Fig. 13 is an enlarged fragmentary view of one of the ribbon-supporting rollers and a fragmentary view of the ribbon. Fig. 14 is a transverse section on line $c\,c$, Fig. 13. Fig. 15 is an enlarged fragmentary view, partially in section, showing the manner of maintaining the advertising-ribbon in proper position in the rear of the window. Fig. 16 is an enlarged fragmentary view of a portion of the ribbon-supporting rod, also a fragmentary section through the inclosing case. Fig. 17 is an enlarged detached view of the shifting-gear and the motor. Fig. 18 is an enlarged detached view of the shifting-gear, showing its position when operating the shaft in one direction. Fig. 19 is an enlarged detached view of the shifting-gear in an inoperative position. Fig. 20 is an enlarged detached view of the shifting-gear, showing its position when operating the shaft in the opposite direction to the direction shown in Fig. 18.

Referring to Fig. 1, A designates the car; B, the advertising devices, of which a plurality are arranged and supported in the upper portions of the car sides; C, the operating-motor, which in this case is of the electric type, and D the reversing-gearing.

For an explanation of the construction of the advertising device B reference is to be had to Figs. 2, 3, and 4.

1 is an inclosing case, which has a window 2, through which the advertisements are displayed. The case is provided with the slots 3, 4, and 5 in one end and the slot 4 and openings $3^a$ and $5^a$ in the opposite end, and the ends of the rollers 6 and 7, upon which the advertising-ribbon 8 is mounted, are supported in the upper and lower slots 3 and 5 and the openings $3^a$ and $5^a$, and the ends of the shifting operating-shaft 9 are supported in the central slots 4, which are sufficiently enlarged at their inner ends to allow the necessary movement to shift the shaft 9 into and out of operating position relative to the rollers 6 and 7. (See Fig. 3.) The shifting operating-shaft is journaled in the outer ends of supports which are pivotally supported from the car. Two of these supports are preferably employed, one at each end of the inclosing case, one (designated by the numeral 10) having a single arm (see Fig. 8) and the other (designated by the numeral 11) being forked or bifurcated. (See Fig. 7.) A friction-roller 12 is mounted on the shifting shaft and is adapted to be brought into operative engagement with either the friction-roller 13 on the upper ribbon-roller 6 or the friction-roller 14 on the lower ribbon-roller 7. This friction-roller 12 is supported between the forks or arms of the support 11, substantially as shown in Fig. 2.

The supports 10 and 11 are rigidly fastened to a rock-shaft 15 by screws 16, and the rock-shaft is journaled in the bearing-bracket 17, fastened to the car. The preferred form of the brackets is shown in Figs. 9 and 10. An operating-handle 18 is rigidly fastened to the outer end of the rock-shaft by the set-screw 19. This handle has a spring-tensioned knob 20, which is provided with a locking-pin 21, which is adapted to seat in any one of two openings 22 in a segmental lock-plate 23, and thus lock the shifting operating-shaft in either its raised position when in frictional contact with the upper ribbon-roller or in its central inoperative position. It is not necessary to lock the shifting operating-shaft in its lower position, as its weight will maintain it in sufficient frictional contact with the lower ribbon-roller. The preferred form of the knob and its spring is shown in Fig. 11, in which a spiral spring 24 is fitted around the reduced portion of the locking-pin 21 and maintains said pin in its locking position with a spring tension, the pin abutting against the shoulder 25, formed by reducing the opening 26, through which the pin passes, and the shoulder 27, formed by enlarging the outer end of the pin.

The ends of the advertising-ribbon are secured to the rollers, substantially as shown in Figs. 13 and 14, in which the roller shown is provided with a longitudinal groove 28, into which the ribbon is pressed and held by a rod 29. The rod is secured in its position by locking-collars 30, which are fitted upon each end of the roller and have notches 31 in one edge to permit the removal of the rod when the collars are rotated to bring the notches directly above the rod ends, substantially as shown in Fig. 13.

The shifting operating-shaft has a gear-wheel 32 at its outer end and a reversing device for reversing the rotation of the operating-shaft, while the motor runs in the same direction and carries gear-wheels which gear with the gear-wheel on the motor, and the gear-wheel 32 on the shaft. In describing this portion of the invention attention is called to Figs. 17, 18, 19, and 20.

A swinging bifurcated handle 33 is formed hollow, and a sliding block 34 is mounted in the hollow portion of the handle and has journal-bearings 35, through which the shaft passes. A spiral spring 36 is interposed between the block 34 and the end portion 37 of the handle, and said end portion is detachably fastened to the handle-body 33 by bolts or screws 38. A rod 39 has its upper end interposed between the forks of the lower end of the handle, and a collar 40, encircling said rod, has oppositely-extending pivoting-pintles 40$^a$, which pass through and are secured to said forks. The upper end of the rod 39 has a worm-screw 41, which is adapted to mesh with the gear-wheel 32 on the shifting shaft, and a gear-wheel 42, slidably mounted on the lower portion of the rod, is always held in geared engagement with the shaft 43 of the operating-motor by the double-loop retaining device 44. The rod portion upon which the gear-wheel 42 slides is made square or other equivalent form in cross-section to prevent rotation of the gear-wheel independent of the rod. The lower end of the rod 39 is provided with an enlarged knurled or milled knob 45. The operation of this portion of the invention will be clearly understood by referring to Figs. 18, 19, and 20.

In the adaptation of the invention shown in Figs. 1, 2, and 3 a plurality of the advertising devices are detachably supported from the upper portion of a car side and are operated from a single shifting shaft.

To detachably secure the devices to the car, the curved surface of the car is provided with upper and lower locking depressions or recesses 46 and 47, and the inclosing cases are each provided with upper and lower locking-flanges 48 and 49, which fit in said depressions. Angular spring locking-strips 50 are fastened to the inclosing case and extend along the inner lower surface and bend at substantially right angles and extend downward below the lower locking-flange 49. An operating-rod 51, fastened to each of the strips 50 and extending through the inclosing case, projects sufficiently to enable the operator to release the case by pressing upward upon said rod.

Angular devices 52 are employed to hold the ribbon-rollers in place in the inclosing case, which are pivoted to the inclosing case by pins 53, and have curved portions which fit partially around the roller ends. These devices are maintained in their retaining position by springs 54. Rods 55 are detachably fitted in the inclosing case to hold the ribbon in proper position behind the window. These rods are held in place by the removable pins 56.

To change the ribbon and the advertisements, the inclosing case is detached from its supports, the rods 55 removed, and the ribbon-rollers and the ribbon removed from the case. When the ribbon is wound upon one roller, the operating-shaft is shifted to engage the other roller and the rotation of the operating-shaft is reversed by shifting the gearing so that the unfilled roller will revolve in the proper direction to wind the ribbon. The ribbons employed are necessarily of the same length, as the operating-shaft is shifted for all of the devices at the same time.

We claim as our invention—

1. A plurality of advertising devices, a single shiftable operating-shaft extending through and having connection with all of said advertising devices, a motor, a reversing connection between the motor and operating-shaft and means for shifting said shaft.

2. An advertising device comprising an inclosing case, two rollers in said case, an advertising-ribbon on said rollers, a shifting operating-shaft adapted to operatively engage with either of the rollers, a motor and a reversing device connecting the shaft to the motor.

3. An advertising device comprising an inclosing case, two rollers in said case, an advertising-ribbon on said rollers, a shifting operating-shaft adapted to operatively engage with either of the rollers, a gear-wheel on the operating-shaft, a motor having a shaft, and reversing-gearing connecting the motor-shaft to the gear-wheel.

4. A car having a curved upper side provided with upper and lower recesses, a shifting operating-rod supported from the car, and a plurality of advertising devices having portions adapted to detachably fit in the recesses and slots for the passage of the shifting operating-rod; each of said slots having an inner enlarged opening to provide for the shifting movement of the rod.

JOHN S. DRUAR.
JOHN G. KREGER.

Witnesses:
L. M. BILLINGS,
GEO. A. NEUBAUER.